United States Patent
Karnopp et al.

(10) Patent No.: US 8,596,885 B2
(45) Date of Patent: Dec. 3, 2013

(54) INTEGRATED OPTICAL RECEIVER AND OPTICAL TRANSMITTER ON A SINGLE FLEXIBLE CIRCUIT ASSEMBLY

(75) Inventors: Roger J. Karnopp, Eagan, MN (US);
Kevin J. Thorson, Eagan, MN (US);
Gregory M. Drexler, Minnetonka, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 172 days.

(21) Appl. No.: 12/549,893

(22) Filed: Aug. 28, 2009

(65) Prior Publication Data
US 2011/0052124 A1   Mar. 3, 2011

(51) Int. Cl.
G02B 6/36   (2006.01)
(52) U.S. Cl.
USPC .............................................. 385/88; 385/89
(58) Field of Classification Search
USPC ...................................................... 385/88–92
See application file for complete search history.

(56) References Cited

U.S. PATENT DOCUMENTS

| | | | |
|---|---|---|---|
| 6,892,449 B1 | 5/2005 | Brophy et al. | |
| 7,217,043 B2 * | 5/2007 | Schunk | 385/94 |
| 2003/0053766 A1 | 3/2003 | Cheng et al. | |
| 2003/0201462 A1 | 10/2003 | Pommer et al. | |

OTHER PUBLICATIONS

U.S. Appl. No. 12/554,293, filed Sep. 4, 2009.
U.S. Appl. No. 12/614,663, filed Nov. 9, 2009.
Written Opinion of the International Searching Authority for international application No. PCT/US2010/043673, dated Oct. 29, 2010 (7 pages).

* cited by examiner

Primary Examiner — Kevin S Wood
(74) Attorney, Agent, or Firm — Hamre, Schumann, Mueller & Larson, P.C.

(57) ABSTRACT

A flexible circuit assembly that integrates a first fiber optic die, for example a transmitter die, and a second fiber optic die, for example a receiver die, on a single flexible circuit. Alignment holes and the multiple die are accurately placed on a single flexible circuit. The precise placement of the alignment holes and the fiber optic die facilitate micron alignment accuracy to a mechanical transfer (MT) connector. Fiber optic die circuitry is electrically connected to the first fiber optic die and second fiber optic die and connected to the flexible circuit.

22 Claims, 3 Drawing Sheets

INTEGRATED OPTICAL RECEIVER AND OPTICAL TRANSMITTER ON A SINGLE FLEXIBLE CIRCUIT ASSEMBLY

FIELD

This disclosure relates to a flexible circuit assembly containing at least one optical transmitter die and at least one optical receiver die integrated on a single flexible circuit and the die being positioned on the flexible circuit with a high degree of accuracy to facilitate the accurate alignment of the die with an off-the-shelf fiber optic connector.

BACKGROUND

A known fiber optic transceiver is illustrated in FIG. 1. The known fiber optic transceiver 2 is comprised of a fiber optic transmitter die and a fiber optic receiver die mounted on separate flexible circuit assemblies within the same fiber optic transceiver 2 housing thereby requiring separate fiber pigtails 4, 6 and mechanical transfer (MT) connectors 8, 9. In order to accurately place a die for alignment to an MT connector 8, 9, the single die is placed on a flexible circuit in accordance with the positioning of a global fiducial. The fiducial is the positional marker for an entire frame of flexible circuits, not just a single flexible circuit, which can result in imprecise placement of the die. Once the die is placed, alignment holes are drilled based on the apertures of the die. Alignment errors are common and due to alignment errors the assembly may be unusable or may require an expensive rework.

SUMMARY

A flexible circuit assembly is described that integrates a first fiber optic die and a second fiber optic die on a single flexible circuit. Alignment holes and multiple die are accurately placed on a single flexible circuit. The precise placement of alignment holes and fiber optic die facilitate micron alignment accuracy to a fiber optic connector, preferably an MT connector.

The flexible circuit assembly 10 is used within an optical transceiver component 3 as shown in FIG. 2. Integration of the first fiber optic die and second fiber optic die into a single flexible circuit assembly 10 allows for the use of a single fiber pigtail 17, as shown in FIG. 3, allows reduction for the host board footprint and/or provides additional space on the host board for mounting other components. Integration of the fiber optic die also allows for the miniaturization of optical assemblies used in the optical transceiver component 3. The reduction in size of the optical assemblies within a transceiver component 3 will improve manufacturability and cost. In addition, transceiver reliability and maintainability will improve.

In one example, a fiber optic receiver die and a fiber optic transmitter die are integrated, with micron accuracy, into one flexible circuit assembly and are disposed on a first major surface of the flexible circuit. The first die is located in relation to a local fiducial and the second die is located in relation to the first die or a local fiducial or both. Alignment holes are provided on the flexible circuit during this process and are located in accordance with the die apertures or the fiducials or both. The alignment holes and die are positioned to align with micron accuracy to a fiber optic connector, preferably an off-the-shelf MT connector. Receiver circuitry and transmitter circuitry are electrically connected to the fiber optic receiver die and fiber optic transmitter die, respectively. The circuitry is connected to the flexible circuit. In addition, the fiber optic receiver die and fiber optic transmitter die each contain grounding circuitry and the grounding circuitry of the fiber optic receiver die is isolated from the grounding circuitry of the fiber optic transmitter die.

DRAWINGS

DETAILED DESCRIPTION

A flexible circuit assembly is described that integrates a first fiber optic die and a second fiber optic die on a single flexible circuit. Fiber optic die circuitry, including isolated grounding circuitry, is also integrated on the flexible circuit assembly. At least one local fiducial is provided on the single flexible circuit making possible the accurate aligning and placement of alignment holes and fiber optic die to facilitate micron alignment accuracy of the die to an MT connector. It is to be realized however, that the connector is not limited to being an MT connector. The fiber optic connector can be any type of connector including, but not limited to, SC, ST, FC, LC, FDDI, etc.

Figure 4:
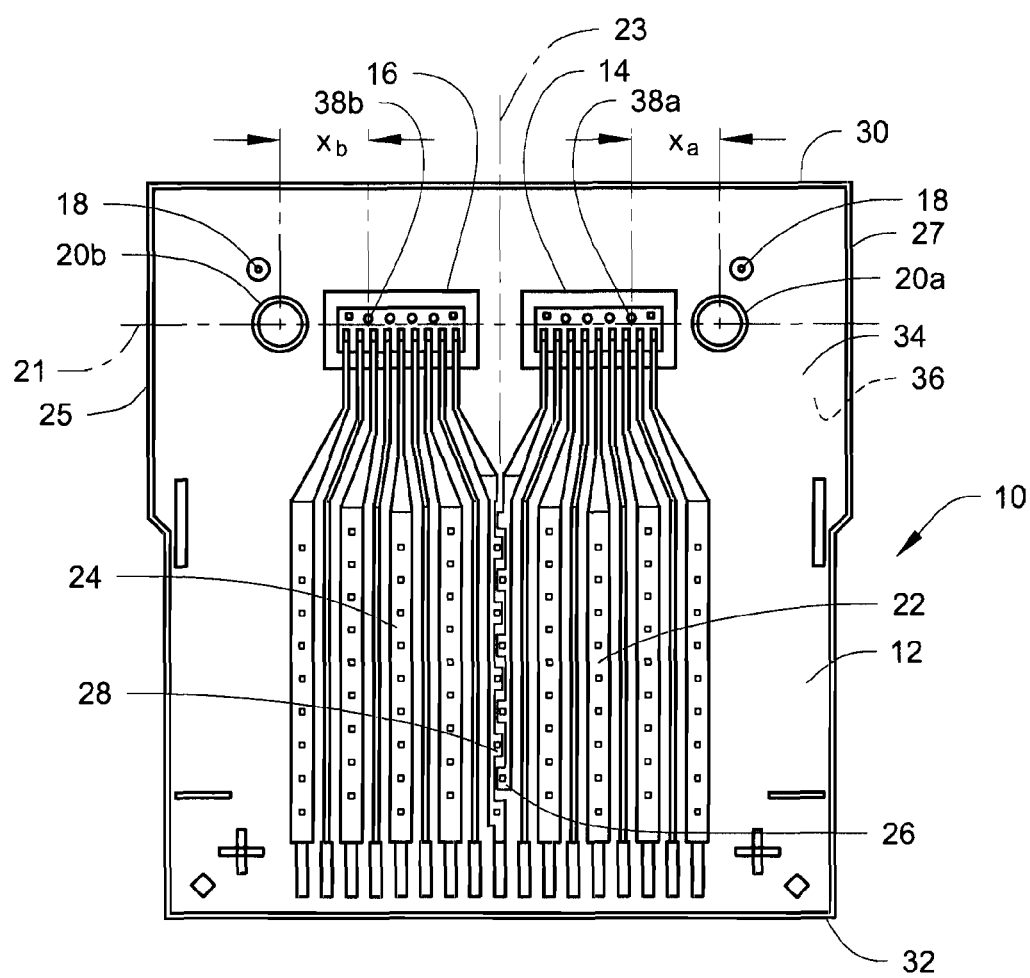
FIG. 4 illustrates a flexible circuit assembly integrating a fiber optic receiver die and a fiber optic transmitter die on a single flexible circuit.

Referring to FIG. 4, one example of a flexible circuit assembly 10 contains a flexible circuit 12, at least one first fiber optic die 14, at least one second fiber optic die 16, a plurality of local fiducials 18, a plurality of alignment holes 20a, 20b, first die voltage circuitry 22, second die voltage circuitry 24, first die grounding circuitry 26, and second die grounding circuitry 28. As described further herein, the first die 14 will be described as a transmitter die that performs an optical transmission function, and the second die 16 will be described as a receiver die that performs an optical receive function. It is to be realized however, that the die 14, 16 are not limited to being transmitter and receiver die.

Figure 1:
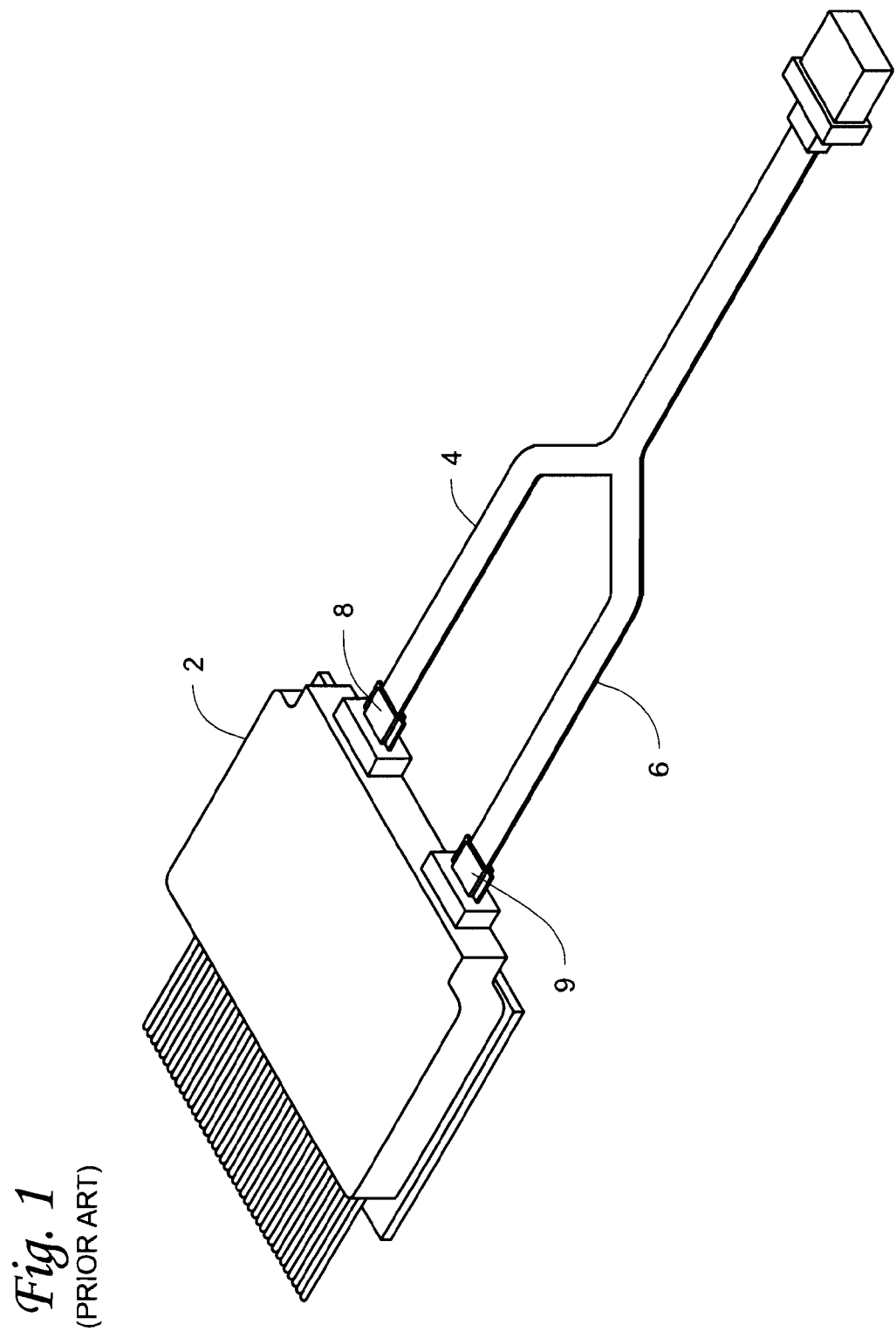
FIG. 1 illustrates a conventional fiber optic transceiver that utilizes two fiber pigtails.
Figure 2:
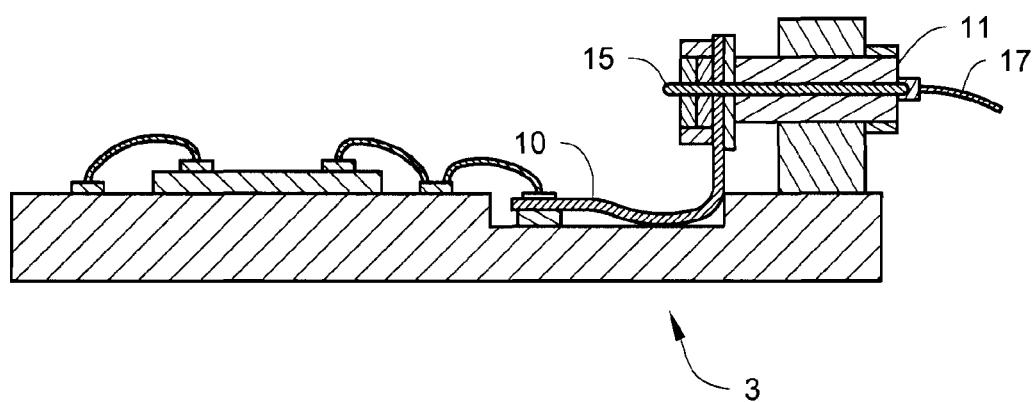
FIG. 2 illustrates a cross-sectional view of a fiber optic transceiver assembly utilizing a flexible circuit assembly containing multiple fiber optic die.
Figure 3:
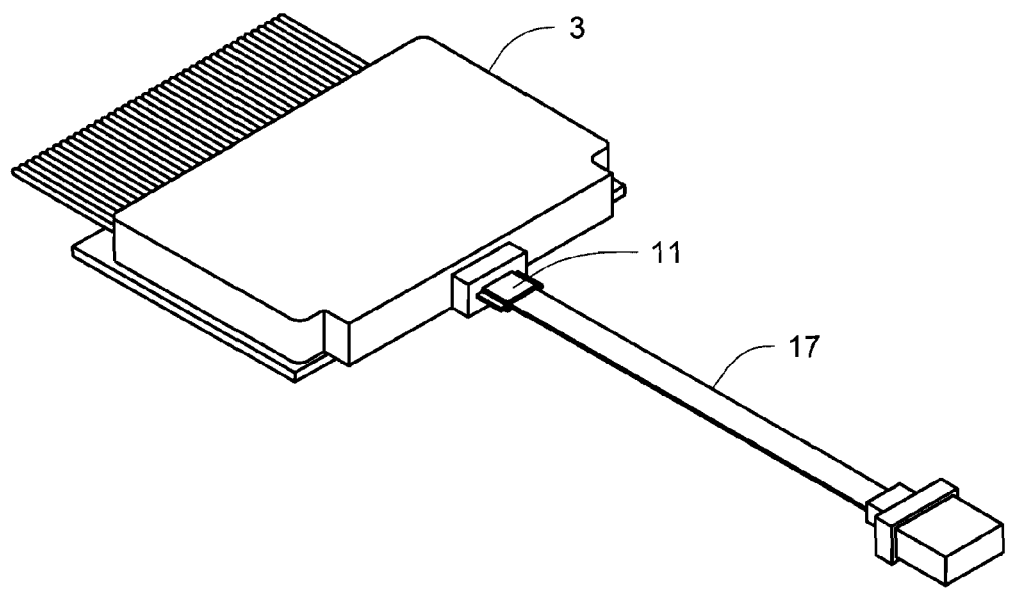
FIG. 3 illustrates a fiber optic transceiver assembly utilizing a flexible circuit assembly containing multiple fiber optic die.

The flexible circuit 12 has a flat ribbon-like shape with a first end 30, a second end 32 opposite the first end 30, a first side 25 opposite a second side 27, a first major surface 34 and a second major surface 36. The flexible circuit 12 can be any size or shape that allows for the integration of the flexible circuit 12 in an optical transceiver component 3, as shown in FIGS. 2 and 3.

The flexible circuit 12 could be made of, for example, a polyimide material. In one example, the flexible circuit 12 is made of a material or of materials added to provide a similar thermal coefficient of expansion as an MT connector 11. In the illustrated example, the region of the flexible circuit 12 adjacent the first end 30 at least in the areas of the die 14, 16 is made light translucent. For example, the material of the flexible circuit 12 adjacent the die 14, 16 can be a light translucent material that is effectively transparent to the wavelength of optical light thereby allowing an MT connector 11 to transmit and receive optical signals through the flexible circuit 12 to the transmitter die 14 and the receiver die 16 and to allow the die 14, 16 to transmit and receive optical signals through the flexible circuit 12 to the MT connector 11.

The alignment holes 20a, 20b extend through any portion of the flexible circuit 12 from the first major surface 34 to the second major surface 36. In the embodiment shown in FIG. 3, the alignment holes 20a, 20b of FIG. 4 are located adjacent the first end 30 of the flexible circuit 12. Centers of the alignment holes 20a, 20b are aligned along a first axis 21 that is, in the illustrated example, generally parallel to the first end 30. The flexible circuit 12 also has a second axis 23 that is perpendicular to the first axis 21, and the alignment holes 20a, 20b are equidistant from the second axis 23 on either side thereof. In use of the flexible circuit 12, alignment pins 15 (FIG. 2) of an off-the-shelf ferrule MT connector 11 extend through the alignment holes 20a, 20b.

The transmitter die 14 and the receiver die 16 are disposed on the flexible circuit 12 adjacent the first end 30. In the illustrated example shown in FIG. 4, the die 14, 16 are disposed on the first major surface 34 of the flexible circuit 12. The transmitter die 14 can be any device configured to transmit optical signals. For example, the transmitter die 14 can be a vertical cavity surface emitting laser (VCSEL). The receiver die 16 can be any device configured to receive optical signals. For example, the receiver die 16 can be a pin diode array (PDA).

The die 14, 16 can be attached to the flexible circuit 12 with, for example, adhesives, epoxy, or by thermal compression bonding. In the embodiment shown in FIG. 4, the die 14, 16 are mounted to be aligned along the first axis 21 between the alignment holes 20a, 20b with micron accuracy. The transmitter die 14 is adjacent the first alignment hole 20a and the receiver die 16 is adjacent the second alignment hole 20b. The die 14, 16 each include a plurality of apertures 38 including a first aperture 38a, 38b that is closest to the respective alignment hole 20a, 20b, and the distance $x_a$, $x_b$ between each of the first apertures 38a, 38b and the center of the adjacent alignment hole 20a, 20b has, for example, a geometric true position tolerance at the center axis in the order of 10 microns or less. The advantage of requiring this level of tolerance is to ensure that the core of the fiber is aligned accurately with the aperture thereby maintaining a high level of performance. In the embodiment of FIG. 4, the die 14, 16 each contain four apertures 38. The apertures 38 comprise openings through which light can pass and enter or exit the die 14, 16. The die 14, 16 can be made of a semiconductor material, for example, silicon and the coefficient of thermal expansion properties of the die and what it is mounted to requires design management. It is to be realized however, that any part of the die 14, 16 structure can be used as the reference point for positioning and positioning is not limited to using the apertures as the reference point.

As shown in FIG. 4, the first die circuitry 22 is electrically connected to the transmitter die 14 so that it forms transmitter circuitry 22, and the second die circuitry 24 is electrically connected to the receiver die 16 so that it forms receiver circuitry 24. The transmitter circuitry 22 and receiver circuitry 24 are disposed on a surface of and connected to the flexible circuit 12. In the illustrated example, the transmitter circuitry 22 and the receiver circuitry 24 are on the first major surface 34 of the flexible circuit 12. However, the circuitry could be disposed on the second major surface 36 of the flexible circuit 12 or could be incorporated into a multiple layer flexible circuit.

The transmitter circuitry 22 and the receiver circuitry 24 contain the die grounding circuitry 26, 28, respectively, with the transmitter grounding circuitry 26 isolated from the receiver grounding circuitry 28.

At least one fiducial 18 must be disposed on the flexible circuit 12. In the embodiment of FIG. 4, a plurality of local fiducials 18 are on the flexible circuit 12 adjacent the first end 30. The local fiducial 18 is not limited to placement adjacent the first end 30 and could be located at any position on the flexible circuit 12 as long as it can be used to accurately position the die 14, 16 and can also be used to position the alignment holes 20a, 20b. In addition, the local fiducial 18 can be any type of mark that allow for the identification of position to facilitate the accurate placement of the die 14, 16 and can also be used to position the alignment holes 20a, 20b. In the illustrated example, the local fiducials 18 are marks that are on the first major surface 34 of the flexible circuit 12.

The transmitter die 14 is connected to the flexible circuit 12 at a predetermined spacing relative to the adjacent local fiducial 18 on the flexible circuit 12. The receiver die 16 is connected to the flexible circuit 12 at a predetermined spacing relative to its adjacent local fiducial 18 or with respect to the transmitter die 14 or both. The alignment hole 20a is formed through the flexible circuit 12 at a location that is determined with respect to the location of the transmitter die 14 apertures or the adjacent local fiducial 18 or both. In one embodiment, the alignment holes 20a, 20b are formed at locations that are determined with respect to the first apertures 38a, 38b of the die 14, 16. In another embodiment, the alignment holes 20a, 20b are formed at locations that are determined with respect to the first aperture 38a of the transmitter die 14. It is to be realized however, that any part of the die 14, 16 structure may be used as a reference point and positioning is not limited to the use of the apertures 38a, 38b. Aligning the die 14, 16 and the alignment holes 20a, 20b with respect to the local fiducials 18 allow the die 14, 16 to be placed with micron accuracy, enabling the die 14, 16 to line up with each other and with the MT connector 11.

To assemble the flexible circuit assembly 10, the local fiducials 18 are pre-marked on the flexible circuit 12. In one embodiment, the transmitter die 14 is mounted by locating the die 14 in relation to its adjacent fiducial 18 so that it is at a predetermined spacing relative to its adjacent fiducial. Then the receiver die 16 is mounted with respect to the transmitter die 14 or its adjacent fiducial or both. Thereafter, the alignment holes 20a, 20b are formed, for example by drilling, in relation to the apertures 38a, 38b of the die or the fiducials 18 or both.

The examples and embodiments disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A flexible circuit assembly comprising:
   a flexible circuit, wherein the flexible circuit includes first and second opposite ends, a first major surface and a second major surface;
   a first alignment hole and a second alignment hole adjacent the first end;
   a fiber optic transmitter die and a fiber optic receiver die attached to the first major surface adjacent the first end;
   transmitter circuitry and receiver circuitry connected to the flexible circuit and electrically connected to the fiber optic transmitter die and the fiber optic receiver die, respectively; and
   at least one fiducial on the flexible circuit adjacent the first end positioned to locate the fiber optic transmitter die and the fiber optic receiver die on the flexible circuit,
   wherein the first end of the flexible circuit includes at least one solid section made of light transmissive material between the first major surface and the second major surface, the fiber optic transmitter die and the fiber optic receiver die each face a portion of the at least one solid section made of light transmissive material, and the light transmissive material of the respective portion is transparent to the respective wavelength of optical light transmitted from or received by the fiber optic transmitter die and the fiber optic receiver die so that optical signals can be transmitted and received through the surfaces of the flexible circuit.

2. The flexible circuit assembly of claim 1, wherein the fiber optic transmitter die and the fiber optic receiver die are positioned between the first and second alignment holes.

3. The flexible circuit assembly of claim 1, wherein the transmitter circuitry and the receiver circuitry are on the first major surface.

4. The flexible circuit assembly of claim 1, wherein the fiducial comprises a marking on the first major surface.

5. The flexible circuit assembly of claim 1, wherein the fiber optic transmitter die is adjacent the first alignment hole and the fiber optic receiver die is adjacent the second alignment hole; the fiber optic transmitter die and the fiber optic receiver die each include a plurality of apertures on the respective die, including a first said aperture that is closest to the respective alignment hole, and a distance between each of the first said apertures and the adjacent alignment hole has a geometric true position tolerance at the center axis in the order of 10 microns or less.

6. The flexible circuit assembly of claim 1, wherein the fiber optic transmitter die is a vertical cavity surface emitting laser and the fiber optic receiver die is a pin diode array.

7. The flexible circuit assembly of claim 6, wherein the vertical cavity surface emitting laser and the pin diode array each include at least four apertures.

8. A flexible circuit assembly comprising:
a flexible circuit, wherein the flexible circuit includes first and second opposite ends, a first major surface and a second major surface;
a first alignment hole and a second alignment hole adjacent the first end;
a first fiber optic transmitter or receiver die and a second fiber optic transmitter or receiver die attached to the first major surface adjacent the first end;
first die circuitry and second die circuitry connected to the flexible circuit and electrically connected to the first fiber optic transmitter or receiver die and the second fiber optic transmitter or receiver die, respectively; and
fiducials on the flexible circuit adjacent the first end positioned to locate the fiber optic transmitter die and the fiber optic receiver die on the flexible circuit,
wherein the first end of the flexible circuit includes at least one solid section made of light transmissive material between the first major surface and the second major surface, the first die and the second die each face a portion of the at least one solid section made of light transmissive material, and the light transmissive material of the respective portion is transparent to the respective wavelength of optical light transmitted from or received by the fiber optic transmitter die and the fiber optic receiver die so that optical signals can be transmitted or received through the surfaces of the flexible circuit.

9. The flexible circuit assembly of claim 8, wherein the first fiber optic die is a transmitter die and the second fiber optic die is a receiver die.

10. The flexible circuit assembly of claim 9, wherein the transmitter die is a vertical cavity surface emitting laser and the receiver die is a pin diode array.

11. The flexible circuit assembly of claim 8, wherein the first fiber optic transmitter or receiver die and the second fiber optic transmitter or receiver die are positioned between the first and second alignment holes.

12. The flexible circuit assembly of claim 8, wherein the first die circuitry and the second die circuitry are on the first major surface.

13. The flexible circuit assembly of claim 8, wherein the fiducials comprise markings on the first major surface.

14. The flexible circuit assembly of claim 8, wherein the first fiber optic transmitter or receiver die is adjacent the first alignment hole and the second fiber optic transmitter or receiver die is adjacent the second alignment hole; the first fiber optic transmitter or receiver die and the second fiber optic transmitter or receiver die each include a plurality of apertures on the respective die, including a first said aperture that is closest to the respective alignment hole, and a distance between each of the first said apertures and the adjacent alignment hole has a geometric true position tolerance at the center axis in the order of 10 microns or less.

15. The flexible circuit assembly of claim 1, wherein centers of the first alignment hole and the second alignment hole are aligned along an axis of the flexible circuit, the axis is generally parallel to the first end, and the at least one fiducial is positioned between the first end and the axis.

16. The flexible circuit assembly of claim 8, wherein centers of the first alignment hole and the second alignment hole are aligned along an axis of the flexible circuit, the axis is generally parallel to the first end, the fiducials are positioned between the first end and the axis.

17. The flexible circuit assembly of claim 6, wherein the apertures of each of the dies comprise openings through which the optical light transmitted or received through the surfaces of the flexible circuit can pass and enter or exit the respective die.

18. The flexible circuit assembly of claim 14, wherein the apertures of each of the dies comprise openings through which the optical light transmitted or received through the surfaces of the flexible circuit can pass and enter or exit the respective die.

19. The flexible circuit assembly of claim 5, wherein centers of the first alignment hole and the second alignment hole are aligned along a first axis of the flexible circuit; the plurality of apertures of the fiber optic receiver die are aligned along a second axis of the flexible circuit; the plurality of apertures of the fiber optic transmitter die are aligned along a third axis of the flexible circuit; the first, second and third axes are generally parallel with each other; and the first axis extends through the fiber optic receiver die and the fiber optic transmitter die.

20. The flexible circuit assembly of claim 14, wherein centers of the first alignment hole and the second alignment hole are aligned along a first axis of the flexible circuit; the plurality of apertures of the first die are aligned along a second axis of the flexible circuit; the plurality of apertures of the second die are aligned along a third axis of the flexible circuit; the first, second and third axes are generally parallel with each other; and the first axis extends through the fiber optic receiver die and the fiber optic transmitter die.

21. A flexible circuit assembly comprising:
a flexible circuit, wherein the flexible circuit includes first and second opposite ends;

a first alignment hole and a second alignment hole adjacent the first end, centers of the first alignment hole and the second alignment hole are aligned along a first axis;

a fiber optic transmitter die and a fiber optic receiver die connected to the flexible circuit adjacent the first end, the fiber optic transmitter die and the fiber optic receiver die are positioned between the first and second alignment holes, the first axis extends through the fiber optic transmitter die and the fiber optic receiver die, the fiber optic transmitter die is positioned entirely between the fiber optic receiver die and the first alignment hole, and the fiber optic receiver die is positioned entirely between the fiber optic transmitter die and the second alignment hole; and transmitter circuitry and receiver circuitry connected to the flexible circuit and electrically connected to the fiber optic transmitter die and the fiber optic receiver die, respectively.

22. The flexible circuit assembly of claim 21, further comprising at least one fiducial on the flexible circuit adjacent the first end and positioned to locate the fiber optic transmitter die and the fiber optic receiver die on the flexible circuit.

\* \* \* \* \*